Nov. 3, 1953   W. A. LUENEBURG   2,657,382
NAIL DRIVING DEVICE
Filed Oct. 26, 1951

Inventor
WILLIAM A. LUENEBURG
By John N. Randolph
Attorney

Patented Nov. 3, 1953

2,657,382

UNITED STATES PATENT OFFICE 2,657,382

NAIL DRIVING DEVICE

William A. Lueneburg, Oakwood, Wis.

Application October 26, 1951, Serial No. 253,305

6 Claims. (Cl. 1—47)

This invention relates to an apparatus or device for driving nails and similar driven fastenings of the type driven by an impact stroke and has for its primary object to provide a device by means of which such driven fastenings may be much more readily driven into extremely hard material, ordinarily not readily penetrable by nails, such as concrete, cinder block or the like, and by means of which driven fastenings may be driven into such material without buckling of the nails.

Another object of the invention is to provide a device primarily intended to be used for driving nails and similar fastenings for securing wooden strips or the like to surfaces of concrete, cinder block or the like and which device is provided with means by which it may be temporarily secured to such a strip so both hands may be employed if necessary for actuating an impact tool used to drive the nail, especially where the driving of the nail is accomplished in an inaccessible space.

A further object of the invention is to provide a nail driving device or apparatus of extremely simple construction yet which is very strong and durable for accomplishing its intended result and which eliminates the possibility of a nail being hit a glancing blow which would cause the nail to buckle or turn over and which will insure that the thrust imparted to the nail will be in a direction substantially axially of the nail.

A further object of the invention is to provide a driving apparatus which is so constructed that possibility of the nail being driven too far by an excessive impact stroke is eliminated so that the nail may not be driven through the strip to be secured thereby and which would render it ineffective for accomplishing its intended result.

Various other objects and advantages of the invention will hereinafter become more fully apparent from the following description of the drawing, illustrating a presently preferred embodiment thereof, and wherein.

Figure 3:
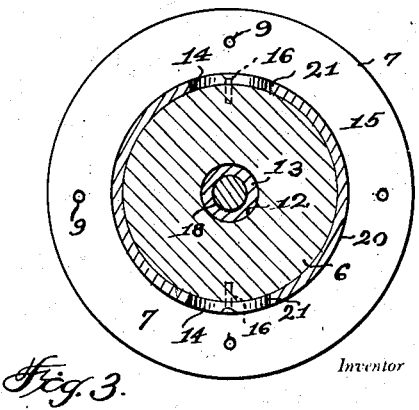
Figure 3 is a cross sectional view taken substantially along a plane as indicated by the line 3—3 of Figure 1.

Referring more specifically to the drawing, the nail driving device in its entirety is designated generally 5 and includes an elongated body member 6 having an enlargement at one end thereof forming a base 7 which is provided with a flat outer surface 8, constituting the bottom of the body member 6, which is disposed perpendicular to the longitudinal axis of said body member. A plurality of anchoring pins 9 are secured in any suitable manner as by press fit engagement in the base 7, remote to its center and said pins have tapered pointed ends 10 which project from the flat base surface 8. The body member 6 is provided with a centrally disposed bore 12 which extends therethrough and through the base 7. A bushing or sleeve 13 of a hardened metal is secured, as by a press fit engagement, in the inner or lower end of the bore 12 including the portion thereof formed in the base 7 and in the portion of the body member 6 located adjacent thereto. A pair of blocks or rigid abutment members 14 is secured to opposed portions of the body member and preferaby abut against the surface 15 of the base 7, which is disposed opposite to the flat surface 8. Said blocks or abutment members 14 are secured by suitable fastenings 16 which are anchored in the body member 6 and said blocks conformably fit against the body member 6, as illustrated in Figure 3.

Figure 1:
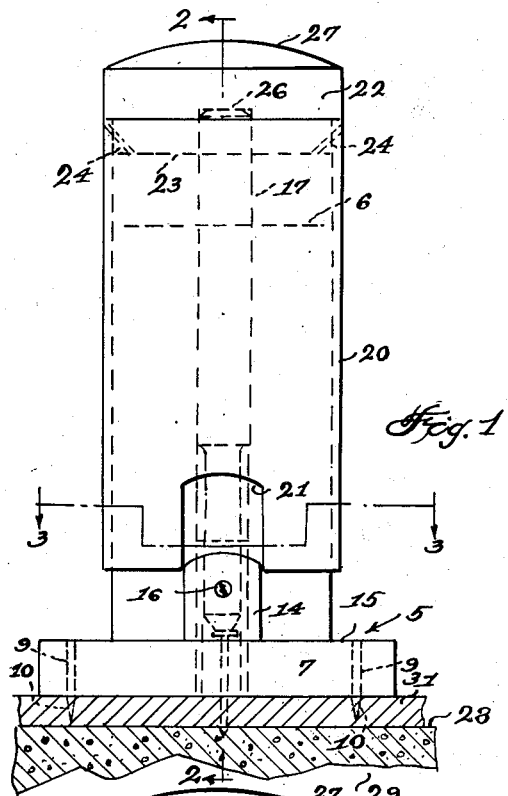
Figure 1 is a side elevational view showing the invention in an applied position.
Figure 2:
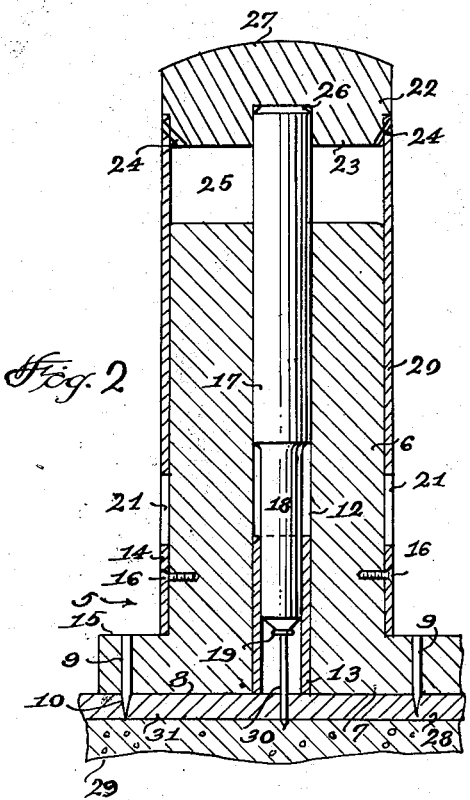
Figure 2 is a vertical sectional view thereof taken substantially along a plane as indicated by the line 2—2 of Figure 1.

An elongated plunger 17 slidably and turnably fits the bore 12 and is provided with a restricted end portion 18 sized to slidably and turnably engage the bushing 13 and which has a restricted flat end 19 disposed perpendicular to the axis of the plunger 17 and at the distal end of the restricted portion 18. The over-all length of the plunger 17 is greater than the length of the bore 12 and said plunger projects from the end of the bore and the end of the body member 6 located remote to the base 7. A sleeve 20 slidably and turnably engages the body member 6 and has one end located adjacent the base 7 which is provided with oppositely disposed longitudinally extending notches 21 which open outwardly of said end and which are of a length and width slightly greater than the length and width, respectively, of the abutment members 14 to accommodate said abutment members therein when the notches 21 are aligned therewith, as illustrated in Figures 1 to 3. An impact receiving head 22 is provided with a restricted end 23 which fits snugly into the opposite end of the sleeve 20 beyond the end of the body member 6 located remote to the base 7 and which may be secured therein by a press fit engagement. The sleeve 20 is longer than the body member 6 to normally space the head portion 23 from said body member. The head portion 23 and sleeve 20 are provided with communicating bores forming vent passages 24 for venting the chamber 25 to the atmosphere, said chamber being formed by the sleeve 20, body member 6 and head 22. The head portion 23 is provided with a centrally disposed recess or depression 26 in which is seated the end of the plunger 17 which extends from the body member 6. The opposite, enlarged end of the head 22, which projects from the end of the sleeve in which the portion 23 is fitted, is provided with a convexly rounded outer anvil surface 27.

Figure 4:
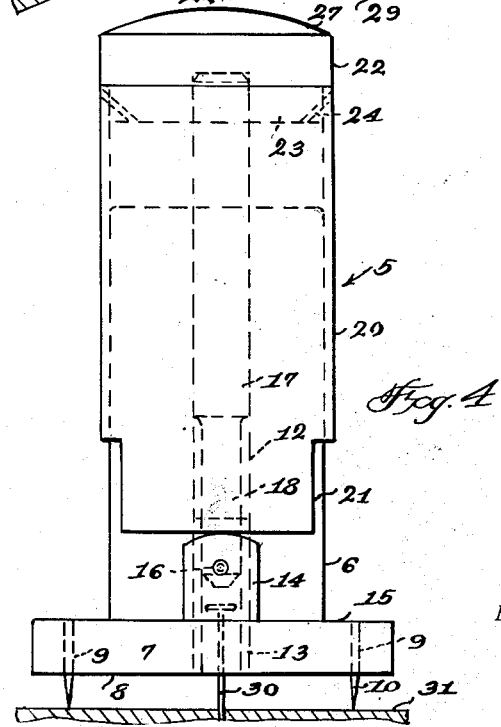
Figure 4 is a view similar to Figure 1 showing an initial position of the invention preparatory to temporarily securing it to a supporting strip.

Assuming that it is desired to secure a strip or piece of wood or other suitable material 31 to a side or face 28 of a mass or block of a hard material 29 such as concrete, cinder block or the like, a nail 30, which may be specially tempered, is driven in a conventional manner through or substantially through the strip 31 at the position where it is desired to drive the nail through said strip and into the mass or block 29. The assembled nail driver 5 is then applied over the protruding head portion of the nail 30 so that said head portion will be located centrally or substantially centrally within the bushing 13 and the pointed ends 10 of the anchoring pins 9 will be abutting against the outer surface of the strip or piece 31. The sleeve 20 is turned on the body member 6 to move its notches 21 out of registration with the blocks or abutment members 14, as illustrated in Figure 4 and with the driver 5 thus disposed, the anvil surface 27 is struck with a hammer or other impact tool with sufficient force to cause the tapered points 10 to penetrate the strip or piece 31 so that the base surface 8 will be disposed substantially flush thereagainst and the driver 5 will thus be detachably anchored to the strip 31. The sleeve 20 is then turned on the body member 6 to align its notches 21 with the abutment members 14, as illustrated in Figures 1 to 3, and with the driver 5 thus supported and anchored temporarily on the strip 31, the anvil surface 27 is struck a hard blow with a heavy hammer, sledge or other impact tool. The force thus imparted to the head 22 will be transmitted through the plunger 17 to the nail 30 and as the plunger 17 has a relatively tight or snug sliding engagement in the bore 12 and its portion 18 has a snug sliding engagement in the bushing 13, it will be readily apparent that the thrust against the nail 30 will be transmitted thereto in a direction axially thereof through the distal end 19 of the plunger which seats flat against the head of the nail, for driving the nail without buckling or bending straight into the mass 29. It will be readily apparent that this will be true even though the anvil surface 27 is struck a glancing blow since the sleeve 20 by its snug sliding engagement with the body member 6 additionally assures that the thrust transmitted to the nail through the plunger is in a direction axially of the body 6 and accordingly of the nail 30. Since the driver 5 is temporarily anchored by the pins 9 to the strip 31 both hands may be utilized on the impact tool, not shown, so that ordinarily a sufficiently hard blow may be struck against the head 22 to completely drive the nail with a single stroke and adequate force may be employed for accomplishing the driving of the nail in inaccessible spaces where operation of the handle with one hand would be difficult. In Figures 1 and 2 the nail 30 is shown as it would appear after being slightly driven by the plunger 17, as for example, by a light stroke on the head 22; however, ordinarily a single heavy stroke will completely drive the nail without danger of the nail being driven through the strip 31, since the open end of the sleeve 20 will strike the upper surface 15 of the base 7 and the head portion 23 will strike the adjacent end of the body member 6 to prevent the plunger 17 from being projected sufficiently toward the strip 31 to drive the nail 30 therethrough. The passages 24 permit air to escape from the chamber 25 as the head 22 is driven toward the body member 6 to prevent an air pressure being built up in said chamber and likewise to permit air to enter said chamber to avoid a suction as the sleeve 20 is moved away from the base 7.

Obviously, the driver 5 may be made in various sizes and various other modifications and changes are contemplated and may obviously be resorted to, without departing from the spirit or scope of the invention as hereinafter defined by the appended claims.

I claim as my invention:

1. A device for driving driven fastenings by impact force into a hard mass comprising an elongated body member having an enlargement at one end forming a base, said body member having a bore extending longitudinally therethrough and through the base, said base having an outer surface adapted to be disposed against a member through which a nail is adapted to be driven into a hard mass and into which the pointed end of a nail has been partially driven, a sleeve reciprocably mounted on said body member, a head fixed to an end of the sleeve and supported thereby beyond the end of the body member disposed remote to the base, said head having an outer impact receiving surface adapted to be struck by an impact delivering tool, and a plunger slidably mounted in the bore of the body member having one end projecting therefrom and engaging against said head and an opposite distal end adapted to abut against the head of the nail whereby the head and sleeve are driven toward the base when the impact surface of the head is struck an impact blow for driving the plunger through said bore toward the nail, a plurality of anchoring pins secured in the base having tapered pointed ends projecting from its outer surface and adapted to be temporarily anchored in the member against which the base is disposed for supporting the driver thereon.

2. A device for driving driven fastenings by impact force into a hard mass comprising an elongated body member having an enlargement at one end forming a base, said body member having a bore extending longitudinally therethrough and through the base, said base having an outer surface adapted to be disposed against a member through which a nail is adapted to be driven into a hard mass and into which the pointed end of a nail has been partially driven, a sleeve reciprocably mounted on said body member, a head fixed to an end of the sleeve and supported thereby beyond the end of the body member disposed remote to the base, said head having an outer impact receiving surface adapted to be struck by an impact delivering tool, and a plunger slidably mounted in the bore of the body member having one end projecting therefrom and engaging against said head and an opposite distal end adapted to abut against the head of the nail whereby the head and sleeve are driven toward the base when the impact surface of the head is struck an impact blow for driving the plunger through said bore toward the nail, said sleeve being turnably mounted on the body member and having a plurality of notches opening outwardly of the end thereof disposed adjacent the base, a plurality of abutment members secured to the body member adjacent the base and spaced circumferentially thereof to correspond to the spacing of said notches and sized to be received in the notches when the notches and the abutment members are aligned to permit the sleeve to be displaced toward and substantially into engagement with the base, and said sleeve being turnable on the body member to position its notches out of alignment with the abutment members whereby the abutment members will retain the sleeve against displacement toward the base when in engagement with the end of the sleeve disposed adjacent thereto for supporting the sleeve in a position to permit the tapered ends of the pins to be driven by an impact stroke on the impact surface into the member penetrated by the nail and without displacing the plunger toward and into engagement with the nail.

3. A driving device of the character described comprising an elongated body member having a bore extending longitudinally therethrough, a plunger reciprocally mounted in said bore and extending beyond a first end thereof, a sleeve slidably mounted on said body member having an impact receiving head at one end thereof disposed beyond said first end of the body member and against which a first end of the plunger abuts, the opposite second end of the body member being adapted to be disposed against a member through which a nail is to be driven, the end of the bore disposed adjacent said second end of the body member being adapted to receive an end of a nail started into said member, and said plunger having an opposite, distal end adapted to engage the head of the nail for driving the nail through the member into a hard mass when the impact receiving head is forcibly displaced toward the first end of the body member by an impact stroke on its outer surface, anchoring pins secured in the body member and projecting from its second end and adapted to be anchored in said member for temporarily anchoring the driving device thereto.

4. A driving device of the character described comprising an elongated body member having a bore extending longitudinally therethrough, a plunger reciprocally mounted in said bore and extending beyond a first end thereof, a sleeve slidably mounted on said body member having an impact receiving head at one end thereof disposed beyond said first end of the body member and against which a first end of the plunger abuts, the opposite second end of the body member being adapted to be disposed against a member through which a nail is to be driven, the end of the bore disposed adjacent said second end of the body member being adapted to receive an end of a nail started into said member, and said plunger having an opposite, distal end adapted to engage the head of the nail for driving the nail through the member into a hard mass when the impact receiving head is forcibly displaced toward the first end of the body member by an impact stroke on its outer surface, said sleeve being turnably mounted on the body member and having at least one notch opening outwardly of the end thereof disposed remote to the head, and at least one abutment member secured to the body member and receivable into the notch when in alignment therewith to permit the plunger to be advanced toward the nail for completely driving the nail, said sleeve being turnable to position the notch out of alignment with the abutment member whereby the sleeve is supported by engagement with the abutment member in a retracted position so that the pins may be driven for anchoring the driving device by an impact blow on the head and without advancing the plunger from a retracted position.

5. A driving device of the character described comprising an elongated body member having a bore extending longitudinally therethrough, a plunger reciprocally mounted in said bore and extending beyond a first end thereof, a sleeve slidably mounted on said body member having an impact receiving head at one end thereof disposed beyond said first end of the body member and against which a first end of the plunger abuts, the opposite second end of the body member being adapted to be disposed against a member through which a nail is to be driven, the end of the bore disposed adjacent said second end of the body member being adapted to receive an end of a nail started into said member, and said plunger having an opposite, distal end adapted to engage the head of the nail for driving the nail through the member into a hard mass when the impact receiving head is forcibly displaced toward the first end of the body member by an impact stroke on its outer surface, said plunger having an elongated restricted portion extending from its distal end a portion of the length of the plunger toward the first end thereof and a bushing of hardened metal secured in the bore adjacent the second end of the body member and slidably receiving and guiding said restricted plunger portion.

6. A driving device of the character described comprising an elongated body member having a bore extending longitudinally therethrough, a plunger reciprocally mounted in said bore and extending beyond a first end thereof, a sleeve slidably mounted on said body member having an impact receiving head at one end thereof disposed beyond said first end of the body member and against which a first end of the plunger abuts, the opposite second end of the body member being adapted to be disposed against a member through which a nail is to be driven, the end of the bore disposed adjacent said second end of the body member being adapted to receive an end of a nail started into said member, and said plunger having an opposite, distal end adapted to engage the head of the nail for driving the nail through the member into a hard mass when the impact receiving head is forcibly displaced toward the first end of the body member by an impact stroke on its outer surface, said head, sleeve and first end of the body member defining a chamber, and said sleeve being provided with at least one vent port located adjacent the head for venting said chamber to the atmosphere, to permit an unimpeded telescopic movement of the sleeve over the body member.

WILLIAM A. LUENEBURG.

References Cited in the file of this patent

UNITED STATES PATENTS

| Number | Name | Date |
|---|---|---|
| 608,555 | Nazel | Aug. 2, 1898 |
| 1,237,360 | Martin | Aug. 21, 1917 |
| 2,430,532 | Rayburn | Nov. 11, 1947 |

FOREIGN PATENTS

| Number | Country | Date |
|---|---|---|
| 85,821 | Austria | Oct. 10, 1921 |